United States Patent
Stiehl

(10) Patent No.: US 6,458,027 B1
(45) Date of Patent: Oct. 1, 2002

(54) VALVE FOR VALVING AIR FLOW IN A VENTILATION SYSTEM FOR THE PASSENGER COMPARTMENT OF A MOTOR VEHICLE, AND METHOD FOR MANUFACTURING SAME

(75) Inventor: Udo Stiehl, Hochspeyer (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/806,379
(22) PCT Filed: Oct. 1, 1999
(86) PCT No.: PCT/DE99/03161
§ 371 (c)(1), (2), (4) Date: May 29, 2001
(87) PCT Pub. No.: WO00/20239
PCT Pub. Date: Apr. 13, 2000

(30) Foreign Application Priority Data

Oct. 5, 1998 (DE) .......................................... 198 45 746

(51) Int. Cl.⁷ ................................................. B60H 1/24
(52) U.S. Cl. ...................................... 454/162; 137/855
(58) Field of Search .................................. 454/162, 164, 454/165; 137/67, 855

(56) References Cited

U.S. PATENT DOCUMENTS

| 4,920,865 A | * 5/1990 | Pasquali et al. ............ 454/164 |
| 5,105,731 A | 4/1992 | Kraus |
| 5,194,038 A | * 3/1993 | Klomhaus et al. ........ 137/512.1 |
| 5,263,895 A | 11/1993 | Kraus et al. |
| 5,355,910 A | * 10/1994 | Gies et al. ................... 137/855 |
| 5,503,178 A | * 4/1996 | Miskelley et al. ........ 137/512.1 |
| 6,132,308 A | * 10/2000 | Dietz et al. .................. 454/162 |

FOREIGN PATENT DOCUMENTS

| DE | 35 03 600 A1 | 8/1986 |
| DE | 40 02 052 A1 | 7/1991 |
| DE | 40 23 190 C2 | 1/1992 |
| DE | 197 06 734 A1 | 8/1998 |
| FR | 2 550 484 A1 | 2/1985 |
| GB | 2 179 900 A | 8/1986 |
| GB | 2 216 713 A | 10/1989 |

* cited by examiner

Primary Examiner—Harold Joyce
Assistant Examiner—Derek S. Boles
(74) Attorney, Agent, or Firm—Fay, Sharpe, Fagan, Minnich & McKee, LLP

(57) ABSTRACT

The invention relates to a valve, especially an air entry and air exit ventilation valve for the passenger compartment of a motor vehicle, comprising a housing (1) and at least one closing flap (2) which rests against transversal elements (5) of the housing (1) when in an inoperative position and which is connected to the housing (1) over a supporting area. According to the invention, the housing (1) and the closing flap (2) are produced in a two-component injection molding method, whereby the housing (1) is comprised of a hard material component, and the closing flap (2) is comprised of a material component that is softer than said hard material component. The supporting area of the closing flap (2) and/or of the area of the housing (1) interacting therewith comprise(s) at least one retaining profile which engages inside at least one recess.

20 Claims, 3 Drawing Sheets

VALVE FOR VALVING AIR FLOW IN A VENTILATION SYSTEM FOR THE PASSENGER COMPARTMENT OF A MOTOR VEHICLE, AND METHOD FOR MANUFACTURING SAME

BACKGROUND OF THE INVENTION

The present invention relates to a valve and to a method of manufacturing same, and particularly to a ventilation valve for valving air entry into or air exit out of the passenger compartment of a motor vehicle. The valve includes a housing and at least one closing flap which rests against crosspiece elements when closed and which is connected with the housing over a supporting area. The invention finds application in conjunction with valving air flow in motor vehicle passenger compartment ventilation systems, and will be described with particular reference thereto. However, it is to be appreciated that the present invention is also amenable to a wide range of other like applications.

The prior art German laid-open application DE 40 23 190 A1 teaches a return air blocking unit for use in conjunction with exiting ventilation of a passenger compartment of a motor vehicle. The closing flap is directly connected with the housing and includes a tongue which is firmly engaged in an aperture of the housing. In another embodiment of said prior art, a film hinge connection between the housing and the closing flap is formed during assembly by folding the closing flap around the film hinge.

German patent specification DE 40 02 052 C2 and German laid-open application DE 35 03 600 A1 teach additional air exit ventilation housings for motor vehicles wherein the closing flaps have lip edges which are connected in a non-displacable manner with the housing by means of a separate plug or pin.

The present invention contemplates an improved ventilation valve and method for manufacturing same whereby significant reduction in cost of parts and cost of manufacture is achieved.

SUMMARY OF THE INVENTION

In accordance with one aspect of the present invention, a valve comprises a housing and a closing flap. The housing and closing flap are produced by a two-component injection molding process. The housing is formed from a hard material, while in contrast the flap is formed from a softer material. A supporting area of the closing flap and/or an area of the housing which interacts therewith includes at least one retaining profile which engages at least one recess. Manufacturing of the housing using a hard material with subsequent injection of the closing flap using a softer material is preferably done using a single molding tool. Undesirable adhesion or bonding of the two components at the contacting surfaces is prevented while the connection between the closing flap and the housing takes place only in the supporting region. This results in significant cost reduction by eliminating the installation of the closing flap at the housing.

In accordance with another aspect of the present invention, the supporting region of the closing flap preferably has at least one retaining profile embedded in a recess of the housing. According to another configuration according to the invention, the supporting region of the closing flap is provided with retaining profiles on both opposite sides, with at least one retaining profile engaging a recess in the housing. The retaining profiles are preferably diagonally opposed.

In accordance with yet another aspect of the present invention, the fastening region of the housing is provided with a passage slot. The supporting region of the closing flap extends at least partially through the slot. Adjacent the passage slot, the housing is equipped with at least one recess and/or one retaining profile for engaging a corresponding opposite retaining profile and/or a recess of the supporting region of the closing flap.

According to still yet another aspect of the present invention, the closing flap is connected only in its supporting region with one side of the housing. Beyond that connection, both material components, in spite of the closing flap being supported by the crosspieces of the housing, have no adhesion with each other in the closed state. The two material components are also manufactured in said position.

According to an additional embodiment of the present invention, the supporting region of the closing flap includes a first projecting retaining profile disposed behind the passage slot which engages a recess of the housing. A second, inwardly oriented, retaining profile is disposed diagonally opposite the first projecting retaining profile and abuts an edge of the housing.

BRIEF DESCRIPTION OF THE DRAWINGS

The invention may take form in various components and arrangements of components, and in various steps and arrangements of steps. The drawings are only for the purposes of illustrating preferred embodiments and are not to be construed as limiting the invention.

FIG. 5(*b*) is a cross-sectional view of the retaining profile in accordance with a third preferred embodiment of the invention; and FIG. 5(*c*) is a cross-sectional view of the retaining profile in accordance with a fourth preferred embodiment of the invention.

DETAILED DESCRIPTION OF THE PREFERRED EMBODIMENTS

A first embodiment of the invention will be described with reference to FIGS. 1–4. The valve is particularly adapted for use in controlling air entry into or air exit out of the passenger compartment of a motor vehicle. It is to be appreciated that the description in conjunction with a passenger compartment ventilation system is exemplary only, and the invention is not to be construed as being limited thereto.

Figure 1:
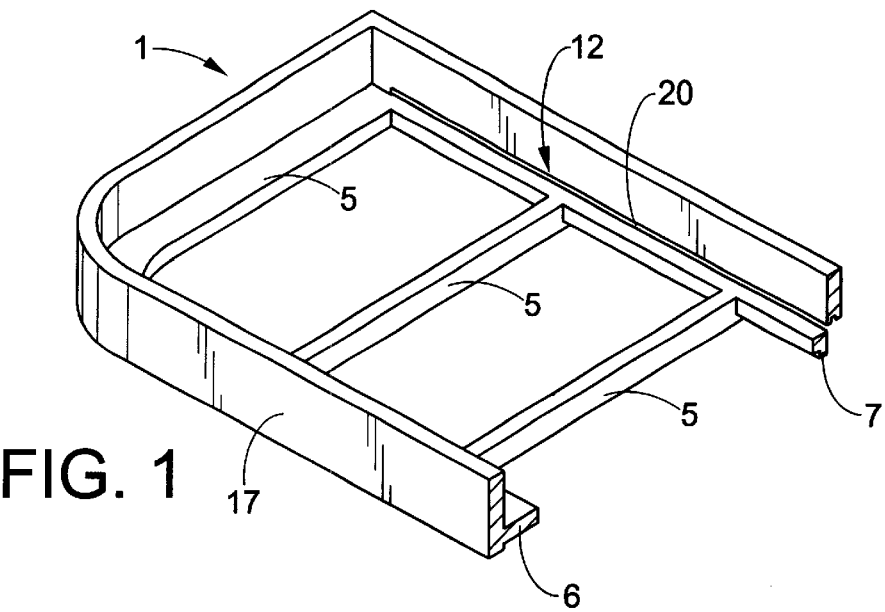
FIG. 1 is a perspective view of a portion of the housing according to a first preferred embodiment of the invention.

As shown in FIG. 1, a housing 1 includes a plurality of spaced apart crosspieces 5. In the embodiment of FIG. 1, the crosspieces 5 lie parallel to one another. However, it is apparent that other crosspiece configurations and arrangements may be substituted therefor, for example diagonal crosspieces.

The crosspieces 5 extend from a fastening region 12 of the housing 1 and across to an abutment flange 6. The entire unit is surrounded by a frame 17. The fastening region 12 preferably includes a passage slot 20 which extends only along one longitudinal side of housing 1 as best seen in FIG. 1. The passage slot 20 is defined by at least one edge of the frame 17 and by at least one edge of a second abutment flange 7.

Figure 2:
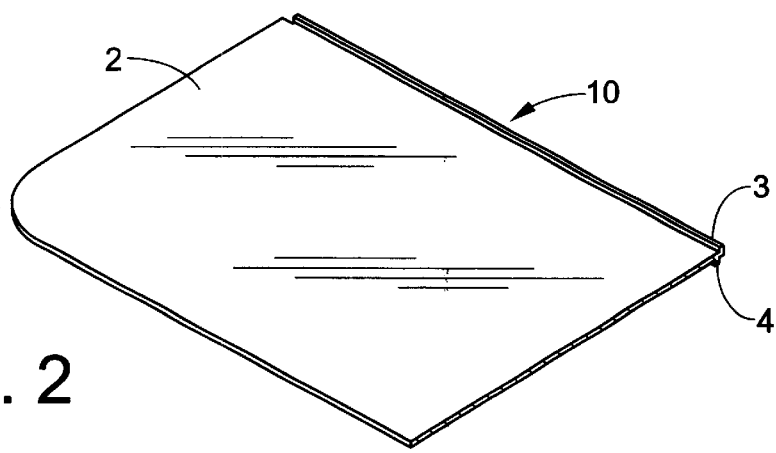
FIG. 2 is a perspective view of a portion of the closing flap for use with the housing according to the embodiment of FIG. 1.

FIG. 2 depicts, in perspective view, a portion of a closing flap 2. The closing flap 2 has a support region 10, which in the embodiment of FIGS. 1–4 includes a first retaining profile 3 and a second retaining profile 4. Retaining profiles 3 and 4 are disposed on the top and the bottom of closing flap 2, respectively. Retaining profiles 3 and 4 are shown most clearly in the enlarged perspective cross-sectional view of FIG. 4 and will be described more fully with reference thereto below.

Figure 3:
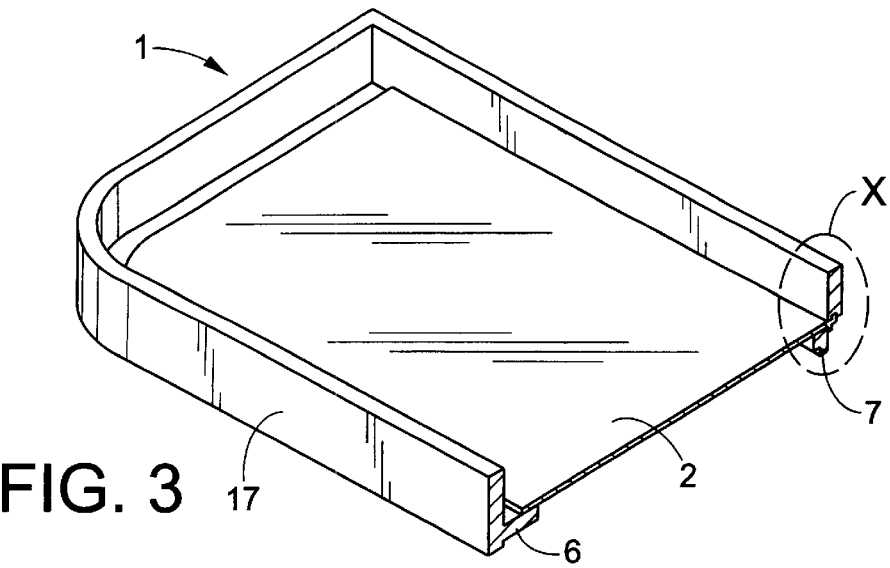
FIG. 3 is a perspective view of the housing and the closing flap portions of FIGS. 1 and 2 combined to form a functional unit with the closing flap illustrated in the closed position.

As shown in FIG. 3, the closing flap 2 cooperates with the housing 1 to form the valve. The housing 1 and the closing flap 2 are preferably produced by a two-component injection molding process, in which the housing 1 is preferably formed from a hard material component, and the closing flap 2 is preferably formed from a comparatively softer material component. In the two-component injection molding process, the housing 1 is first molded, followed by a subsequent injection of the closing flap 2. Preferably, the two-component injection molding process is performed using a single molding tool. The valve is thereby made in a simple fashion and exhibits a high degree of functional reliability.

Figure 4:
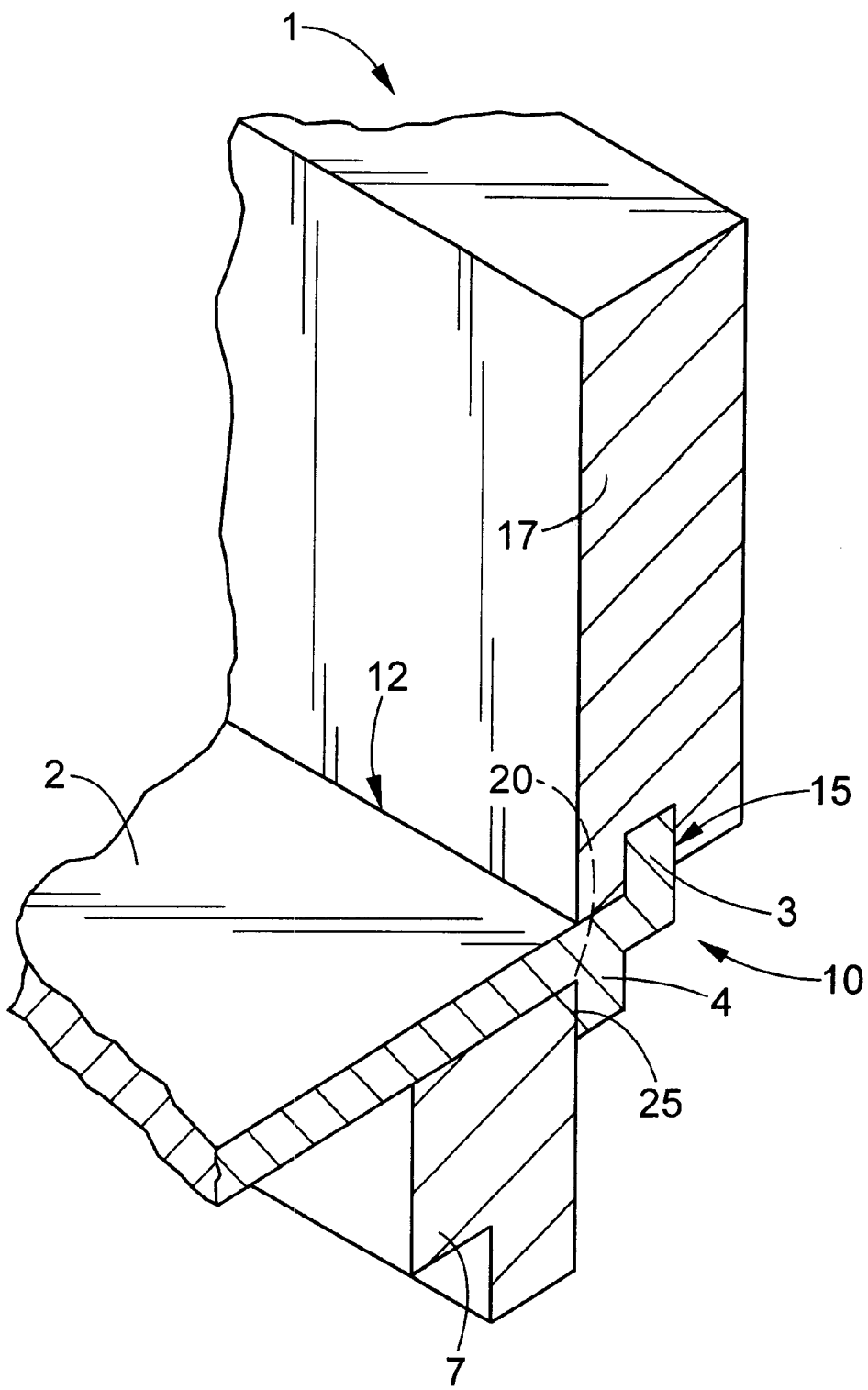
FIG. 4 is an enlarged view of the retaining profile in the dashed region X of FIG. 3, in accordance with the embodiment shown in FIGS. 1–3.

With reference next to FIG. 4, an enlarged view of a dashed region labeled X in FIG. 3 is shown in enlarged perspective cross-section. Region X is a portion of the fastening where the closing flap 2 fastens to the housing 1. The supporting region 10 of the closing flap 2 includes the two retaining profiles 3 and 4 positioned diagonally opposite from each other. The retaining profile 3 engages a corresponding opposite recess 15 of the frame 17 of the housing 1, while retaining profile 4 rests against an edge 25 of the second abutment flange 7 of the housing 1. The combination results in a highly functionally reliable connection of the closing flap 2 to the housing 1. The connection is limited to the fastening region 12 only, thus ensuring that there is no adhesion between the closing flap 2 on the one hand, and the crosspieces 5 or the surfaces of the abutment flanges 6 and 7 of the housing 1 on the other.

In the closed position, the closing flap 2 is positioned in housing 1 on the supporting surfaces of crosspieces 5 as well as on the abutment flanges 6 and 7. With an appropriate air flow, the closing flap 2 lifts off from the supporting surfaces. However, the closing flap 2 is held at the fastening region 12 by the first retaining profile 3 in the recess 15 and by the second retaining profile 4 against the edge 25 of the second abutment flange 7, whereby the closing flap 2 is reliably prevented from detaching or slipping from the housing 1.

It is to be appreciated that the present invention is not limited to fastening the closing flap 2 in housing 1 according to the exemplary embodiment according to FIG. 4 To the contrary, a kinematic reversal of the recesses and retaining profiles is contemplated. In that case, the closing flap is equipped with a recess into which protrudes a transversal element of the housing. In addition, the surface of the abutment flange 7 is also equipped with a retaining profile which embeds itself into a corresponding recess of the closing flap.

Figure 5A:
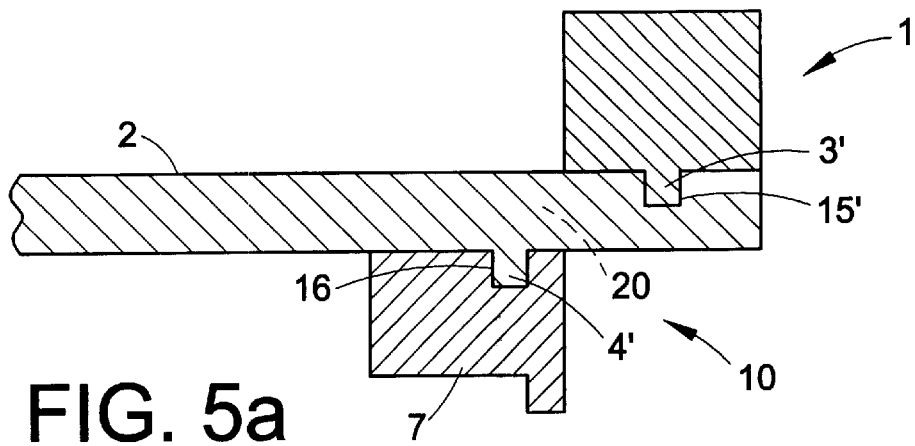
FIG. 5(*a*) is a cross-sectional view of the retaining profile in accordance with a second preferred embodiment of the invention.
Figure 5B:
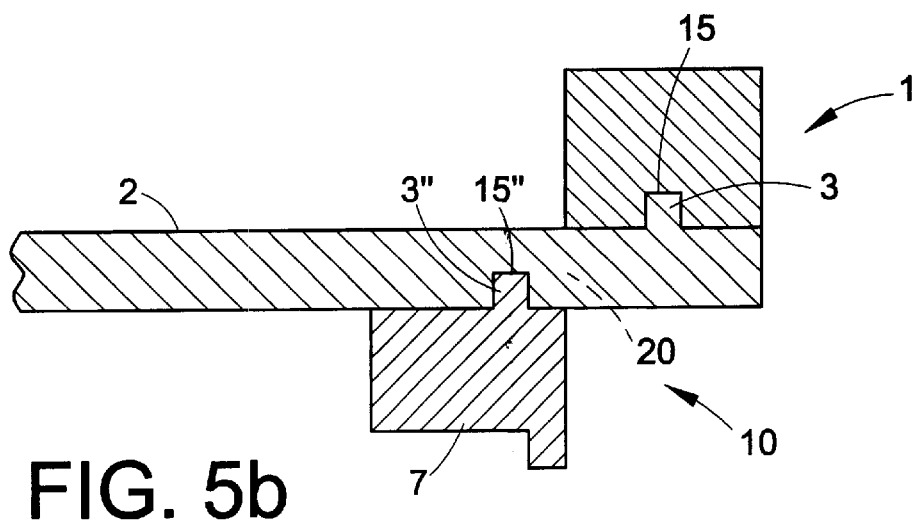
Figure 5C:
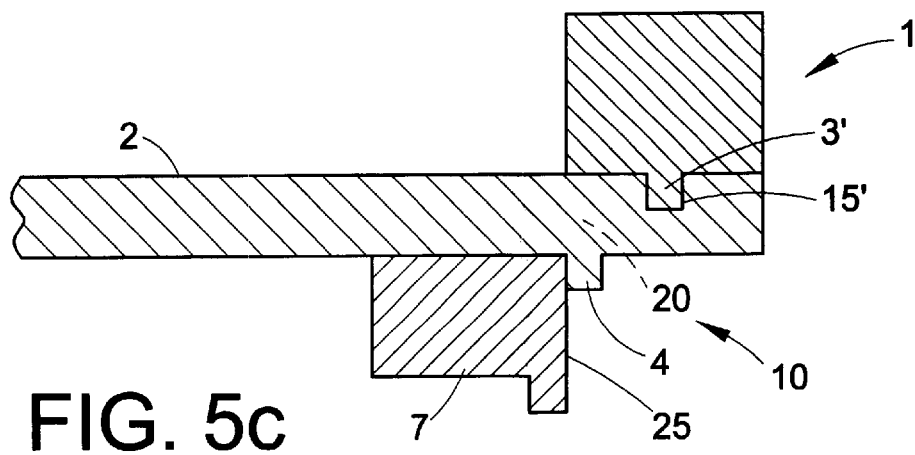

FIGS. 5(*a*)–(*c*) show second, third, and fourth embodiments contemplated for fastening the closing flap 2 to the housing 1. These embodiments facilitate an equivalent kinematic reversal of the operative elements of the connection by providing the closing flap 2 with a recess essentially running the length of the supporting region 10 which engages a corresponding opposite retaining profile formed on the housing 1. The surface of the second abutment flange 7 can also be equipped equivalently with a retaining profile which engages into a corresponding recess of the closing flap 2.

In the second embodiment of the fastening shown in FIG. 5(*a*), the supporting region 10 of the closing flap 2 includes a retaining profile 4' disposed on a first side of the passage slot 20 as well as a recess 15' disposed on a second side of the passage slot 20 opposite from the first side. Housing 1 includes a recess 16 in the second abutment flange 7 which receives the retaining profile 4' of the closing flap 2, and housing 1 additionally includes a retaining profile 3' which engages with recess 15' of the closing flap 2.

In the third embodiment of the fastening shown in FIG. 5(*b*), the supporting region 10 of the closing flap 2 includes a recess 15" disposed on the first side of the passage slot 20, as well as a retaining profile 3 disposed on the second side of the passage slot 20. Housing 1 includes a retaining profile 3" extending from the second abutment flange 7 and engaging the recess 15" of the closing flap 2, and housing 1 additionally includes a recess 15 which engages retaining profile 3 of the closing flap 2.

The fourth embodiment of the fastening is shown in FIG. 5(*c*). In this embodiment, the housing 1 includes a retaining profile 3' which engages a recess 15' disposed on the second side of the passage slot 20 on the supporting region 10 of the closing flap 2. At the underside, the closing flap 2 includes a retaining profile 4 which rests against an edge 25 of the second abutment flange 7 of the housing 1.

It is to be appreciated that in all of the embodiments of the invention described above, the utilization of the two-component injection molding process results in simplified manufacture of the valve at significantly reduced costs.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A valve for use with an associated ventilation system which ventilates the passenger compartment of an associated motor vehicle, the valve comprising:

a housing formed from a first material and including at least a frame and defining a fastening region;

a closing flap formed from a second material softer than said first material, the closing flap having a closed position in which the closing flap is positioned in the housing and is supported on a supporting surface of the housing; and, a supporting region defined on the closing flap and including a first retaining profile, the fastening region and the supporting region being cooperative to fasten the closing flap to the housing at a connection area, wherein:

the fastening region of the housing includes at least one recess adapted to receive the first retaining profile and a passage slot which receives the supporting region of the closing flap and which defines an edge of the housing; and, the closing flap includes a second retaining profile disposed on a first side of the passage slot and diagonally opposite the first retaining profile, the second retaining profile resting against said-edge.

2. A valve comprising:
a housing formed from a first material and including at least a frame and defining a fastening region;
a closing flap formed from a second material softer than said first material, the closing flap having a closed position in which the closing flap is positioned relative to the housing and is supported on a supporting surface of the housing;
a supporting region defined on the closing flap and including a first retaining profile, the fastening region and the supporting region being cooperative to fasten the closing flap to the housing at a connection area, wherein:
the fastening region of the housing includes a passage slot which receives the supporting region of the closing flap;
the supporting region of the closing flap includes a first retaining profile disposed on a first side of the passage slot and a first recess disposed on a second side of the passage slot opposite the first side; and
the fastening region of the housing includes a second recess which receives the first retaining profile, and also includes a second retaining profile which engages with the first recess.

3. A valve for use with an associated ventilation system, the valve comprising:
a housing formed from a first material and including at least a frame and defining a fastening region;
a closing flap formed from a second material softer than said first material, the closing flap having a closed position in which the closing flap is positioned relative to the housing and is supported on a supporting surface of the housing;
a supporting region defined on the closing flap and including a first retaining profile, the fastening region and the -supporting region being cooperative to fasten the closing flap to the housing at a connection area, wherein:
the fastening region of the housing includes a passage slot which receives the supporting region of the closing flap and a first retaining profile disposed adjacent the passage slot; and
the supporting region of the closing flap includes a recess which receives the first retaining profile, and also includes a second, inwardly oriented retaining profile which rests against an edge of the fastening region of the housing.

4. The valve as set forth in claim 1, wherein:
the closing flap is adapted to move to an opened position wherein the closing flap is lifted off from the supporting surfaces under the influence of an associated air flow while remaining fastened to the housing at the connection area.

5. The valve as set forth in claim 1, wherein the supporting surface of the housing include a plurality of crosspieces to support the closing flap when the closing flap is in the closed position.

6. A valve comprising:
a housing formed from a first material and including at least a frame and defining a fastening region;
a closing flap formed from a second material softer than said first material, the closing flap having a closed position in which the closing flap is positioned relative to the housing and is supported on a supporting surface of the housing;
a supporting region defined on the closing flap and including a first retaining profile, the fastening region and the supporting region being cooperative to fasten the closing flap to the housing at a connection area, wherein:
the closing flap and the housing are manufactured by a two-component injection molding process;
the housing is first molded, and the closing flap is formed by a subsequent injection; and,
the housing and the closing flap are both molded using a single molding tool.

7. The valve as set forth in claim 6, wherein during the manufacturing by the two-component injection molding process the housing and the closing flap are formed spatially oriented approximately in the closed position and with the fastening functionally in place.

8. The valve as set forth in claim 7, wherein there is essentially no adhesion between the supporting surfaces of the housing and the surfaces of the closing flap in contact therewith when the closing flap is in the closed position.

9. A method for manufacturing a valve including a substantially rigid housing and at least one flexible closing flap movable between a closed position in which the closing flap is supported by surfaces of the housing to block air flow through the valve and an opened position in which the closing flap is raised off from said surfaces of the housing, the method comprising the steps of:
in a first injection molding step, molding the housing from a hard material; and,
in a second injection molding step, molding the closing flap from a soft material, wherein:
the step of molding the closing flap includes integrally molding a supporting region therewith during the second injection molding step;
the step of molding the housing includes integrally molding a fastening region therewith during the first injection molding step, the fastening region of the housing operatively cooperating with the supporting region of the closing flap to fasten the closing flap to the housing; and,
the first injection molding step and the second injection molding step include molding the housing and the closing flap using a single molding tool.

10. The method according to claim 9, wherein the first injection molding step and the second injection molding step are components of a two-component injection molding process wherein the second injection molding step occurs subsequently to the first injection molding step.

11. The method according to claim 10, wherein the second injection molding step forms the closing flap in operative place, approximately in the closed position relative to the housing with the supporting region of the closing flap operatively cooperating with the fastening region of the housing.

12. The method according to claim 11, wherein the second injection molding step produces no adhesion between the supporting surfaces of the housing and the surfaces of the closing flap.

13. The valve as set forth in claim 2, wherein:
the closing flap is adapted to move to an opened position wherein the closing flap is lifted off from the supporting surface under the influence of an associated air flow while remaining fastened to the housing at the connection area.

14. The valve as set forth in claim 2, wherein the supporting surface of the housing includes a crosspiece to support the closing flap when the closing flap is in the closed position.

15. The valve as set forth in claim 2, wherein the closing flap and the housing are manufactured using a two-component injection molding process.

16. The valve as set forth in claim 3, wherein:

the closing flap is adapted to move to an opened position wherein the closing flap is lifted off from the supporting surface under the influence of an associated air flow while remaining fastened to the housing at the connection area.

17. The valve as set forth in claim 3, wherein the supporting surface of the housing includes a crosspiece to support the closing flap when the closing flap is in the closed position.

18. The valve as set forth in claim 3, wherein the closing flap and the housing are manufactured through use of a two-component injection molding process.

19. The valve as set forth in claim 6, wherein:

the closing flap is adapted to move to an opened position wherein the closing flap is lifted off from the supporting surface under the influence of an associated air flow while remaining fastened to the housing at the connection area.

20. The valve as set forth in claim 6, wherein the supporting surface of the housing includes a crosspiece to support the closing flap when the closing flap is in the closed position.

* * * * *